(12) United States Patent
Parsa et al.

(10) Patent No.: US 7,075,971 B2
(45) Date of Patent: *Jul. 11, 2006

(54) HYBRID DSMA/CDMA (DIGITAL SENSE MULTIPLE ACCESS/CODE DIVISION MULTIPLE ACCESS) METHOD WITH COLLISION RESOLUTION FOR PACKET COMMUNICATIONS

(75) Inventors: Kourosh Parsa, Riverside, CT (US); Emmanuel Kanterakis, North Brunswick, NJ (US)

(73) Assignee: Golden Bridge Technology Incorporated, Long Branch, NJ (US)

( * ) Notice: Subject to any disclaimer, the term of this patent is extended or adjusted under 35 U.S.C. 154(b) by 66 days.

This patent is subject to a terminal disclaimer.

(21) Appl. No.: 10/682,985

(22) Filed: Oct. 14, 2003

(65) Prior Publication Data

US 2004/0081115 A1     Apr. 29, 2004

Related U.S. Application Data

(63) Continuation of application No. 09/695,720, filed on Oct. 25, 2000, now Pat. No. 6,643,318.

(60) Provisional application No. 60/161,443, filed on Oct. 26, 1999.

(51) Int. Cl.
    *H04B 1/69*     (2006.01)
    *H04B 7/216*    (2006.01)

(52) U.S. Cl. ........................ 375/141; 370/335
(58) Field of Classification Search ................ 375/141, 375/130, 146, 147; 370/342, 320, 441, 329, 370/335; 455/509
    See application file for complete search history.

(56) References Cited

U.S. PATENT DOCUMENTS

| 5,103,459 A | 4/1992 | Gilhousen et al. |
| 5,280,472 A | 1/1994 | Gilhousen et al. |

(Continued)

FOREIGN PATENT DOCUMENTS

| WO | WO93/18601 | 9/1993 |

(Continued)

OTHER PUBLICATIONS

Dr. Kourosh Parsa, "Common Packet Channel (CPCH): The optimum wireless Internet mechanism in W-CDMS," IEE 2000, p 148-155.*

(Continued)

*Primary Examiner*—Tesfaldet Bocure
(74) *Attorney, Agent, or Firm*—McDermott Will & Emery LLP

(57) ABSTRACT

A hybrid DSMA-CR/CDMA methodology provides efficient access to one of a group of packet channels in a spread spectrum wireless communication network. The base station broadcasts status information as to the availability and/or available data rates for each packet channel or group of channels. Each mobile station uses the status information to select an available channel and/or a channel with sufficient data rate. The mobile station then starts transmission of a series of access preambles, each of which contains a signature corresponding to the selected channel. The mobile station transmits the preambles at increasing power levels. When the base station detects a preamble transmission, the base station responds with a corresponding acknowledgement essentially permitting the mobile station to send its packet data along with any closed-loop power control information over the selected channel.

27 Claims, 10 Drawing Sheets

U.S. PATENT DOCUMENTS

| | | | |
|---|---|---|---|
| 5,384,777 A | 1/1995 | Ahmadi et al. |
| 5,461,639 A | 10/1995 | Wheatley, III et al. |
| 5,537,397 A | 7/1996 | Abramson |
| 5,544,196 A | 8/1996 | Tiedemann, Jr. et al. |
| 5,673,259 A | 9/1997 | Quick, Jr. |
| 5,802,465 A | 9/1998 | Hamalainen et al. |
| 5,825,835 A | 10/1998 | Kingston et al. |
| 5,841,768 A | 11/1998 | Ozluturk et al. |
| 5,850,602 A | 12/1998 | Tisdale et al. |
| 5,875,182 A | 2/1999 | Hatzipapafotiou |
| 5,893,036 A | 4/1999 | Trandai et al. |
| 5,894,472 A | 4/1999 | de Seze |
| 5,933,777 A | 8/1999 | Rahman |
| 5,943,327 A | 8/1999 | Mademann |
| 5,953,369 A | 9/1999 | Suzuki |
| 5,982,763 A | 11/1999 | Sato |
| 5,991,308 A | 11/1999 | Fuhrmann et al. |
| 6,009,089 A | 12/1999 | Huang et al. |
| 6,011,788 A | 1/2000 | Hurst et al. |
| 6,026,081 A | 2/2000 | Hamabe |
| 6,031,832 A | 2/2000 | Turina |
| 6,038,223 A | 3/2000 | Hansson et al. |
| 6,038,250 A | 3/2000 | Shou et al. |
| 6,041,228 A | 3/2000 | Niska et al. |
| 6,163,533 A | 12/2000 | Esmailzadeh et al. |
| 6,169,759 B1 | 1/2001 | Kanterakis et al. |
| 6,301,286 B1 | 10/2001 | Kanterakis et al. |
| 6,389,056 B1 | 5/2002 | Kanterakis et al. |
| 6,480,525 B1 | 11/2002 | Parsa et al. |
| 6,507,601 B1 | 1/2003 | Parsa et al. |
| 6,643,318 B1 * | 11/2003 | Parsa et al. ............. 375/141 |

FOREIGN PATENT DOCUMENTS

| | | |
|---|---|---|
| WO | WO 003499 A1 | 1/2000 |
| WO | WO 008908 A2 | 2/2000 |
| WO | WO 018172 A1 | 3/2000 |
| WO | WO 022873 A1 | 4/2000 |
| WO | WO 057663 A1 | 9/2000 |

OTHER PUBLICATIONS

"Start UMTS Services with 3G-GPRS:CPCH/FACH," Golden Bridge Technology, Innovations and Technologies, pp. 1-20 (Jun. 27, 2000).

The Common packet Channel considered the 3rd Generation GPRS," System Engineering of Data Services in UMTS W-CDMA Systems," IST Mobile Communications Summit, Galway, Ireland, Oct. 1-4, 2000.

* cited by examiner

HYBRID DSMA/CDMA (DIGITAL SENSE MULTIPLE ACCESS/CODE DIVISION MULTIPLE ACCESS) METHOD WITH COLLISION RESOLUTION FOR PACKET COMMUNICATIONS

RELATED APPLICATION

This application is a continuation 09/695,720 filed Oct. 25, 2000, now U.S. Pat. No. 6,643,318, which claims the benefit of U.S. Provisional Application No. 60/161,443, entitled "HYBRID DSMA/CDMA (DIGITAL SENSE MULTIPLE ACCESS/CODE DIVISION MULTIPLE ACCESS) METHOD WITH COLLISION RESOLUTION FOR PACKET COMMUNICATIONS" filed on Oct. 26, 1999, the disclosure of which is entirely incorporated herein by reference.

FIELD OF THE INVENTION

This invention relates to spread-spectrum communications, and more particularly to code-division-multiple-access (CDMA) cellular, packet-switched communication systems. The inventive concepts involve optimization of packet data communications using a hybrid DSMACR/CDMA multiple access method with collision resolution.

BACKGROUND

Recent developments in wireless communications technologies have allowed expansion of service offerings from the original voice telephone service model to include a number of services supporting packet data communications. As customers become increasingly familiar with data services offered through landline networks, they are increasingly demanding comparable data communications in the wireless domain, for example to maintain service while mobile subscribers roam freely or to provide remote service in locations where wireless loops are preferable to landline subscriber loops. A number of technologies support packet data communications in the wireless domain.

For example, a common-packet channel (CPCH) is an uplink transport channel for transmitting variable size packets from a mobile station (MS) to a base station (BS) without the need for direct resource allocation. The channel resource allocation is contention based. A number of mobile stations could at any time content for the same resources, as found in ALOHA systems. The basic CPCH packet data communication does not address issues such as assignment of the channel resources to various base stations, broadcasting channel status and data rates by the base stations and piggy-backing. If a mobile station cannot access one channel, because the channel is busy, it tries another channel, and so on until it finds and accesses an available channel. When many users are trying to access a limited number of channels, the failed access attempts alone can impose a substantial load and even possibly overload one or more channels of the system.

In a Digital Sense Multiple Access (DSMA) system, whenever a base station detects the presence of a subscriber unit transmission on the reverse channel it asserts a periodically occurring flag, called a "busy/idle" flag, on the associated forward channel. This flag is asserted logically true whenever the channel is busy. Any subscriber unit that already is transmitting when the busy/idle flag is set true may continue to transmit. However, all other subscriber units desiring access to a channel must wait until the busy/idle flag is reset or cleared indicating that at least one channel is idle and available. Since the two-way propagation delay is much less than the minimum packet length, the DSMA type protocols perform much better than traditional slotted ALOHA type protocols. The physical layer and the underlying spread spectrum system allow the quick detection of a collision. This approach only allows the base station to generally throttle back the traffic flow. Essentially, each of the mobile stations will interpret a busy state as an instruction to "backoff" and delay its next access attempt. Although this control from the base station helps to prevent overload, it does not work well when there are multiple CPCH channels. The mobile station(s) cannot determine the busy or idle status of multiple channels from a single busy/idle flag signal.

SUMMARY OF THE INVENTION

This invention introduces a hybrid DSMA-CR/CDMA method and apparatus, which addresses the above issues, thus accommodating bursty packet data traffic in an optimum manner. The hybrid DSMA-CR/CDMA method provides a proactive approach to avoid collision by having the base station broadcast the availability and available data rates for each of its channels or for each group of its channels. The mobile station can use the broadcast information to select an idle channel with sufficient data rate before its transmission, instead of waiting for the base station to resolve the collision, if any, in later procedures. The method also allows priority schemes.

Hence a general objective of the invention is to allow mobile stations to assess the availability of packet channel resources.

Another objective relates to efficiently assigning limited channel resources to various base stations.

A further objective is to allow the mobile units to efficiently utilize the acquired channel by continuously transmitting additional packets, which have been passed on from higher layers during transmission.

The present invention provides an improvement to a code-division-multiple-access (CDMA) system employing spread-spectrum modulation. The CDMA system has a radio network controller (RNC) and a plurality of base stations, which serve a plurality of mobile or remote stations. Each base station has a BS-spread-spectrum transmitter and a BS-spread-spectrum receiver. Each of the mobile stations has an MS-spread-spectrum transmitter and an MS-spread-spectrum receiver. In the preferred embodiment, the RNC monitors traffic demand, based on traffic measurement information of communications through the base stations for the mobile stations. Based on the traffic demand or a projection thereof, the RNC assigns channel resources to the base stations, by re-configuring the channel resources within each cell.

At a base station, the inventive method involves broadcasting, on a periodic or non-periodic basis, availability related status information of one or more of the channels allocated to the base station. For example, the status information can contain actual availability information, i.e. idle or busy, or available data rate information, or both. At a mobile station, the steps include monitoring the broadcast(s) of the status information. Based on the broadcast status information, the mobile station selects an idle channel. The channel selection by the mobile station can utilize a dynamic persistence algorithm or any other algorithm commonly known in the art.

Following channel selection, the mobile station starts transmission of a series of access preambles. Each preamble contains a signature selected from a set of predefined signatures used for communications with the base station. Typically, the preamble signature corresponds to the spreading code and/or the scrambling code used by the network to define the selected logical channel at the physical layer of the CDMA network. The mobile station transmits the preambles, at well-selected time intervals and at increasing power levels. The mobile station stops its transmission of the access preambles when the access preamble has been picked up and detected by the base station, the base station has responded with an acknowledgment AP-AICH, and the mobile station has also successfully received the AP-AICH. Alternatively, the mobile station ceases its access preamble transmissions if the mobile station has transmitted the maximum allowed number of access preambles $M_{AP}$.

Upon receiving this AP-AICH signal, the mobile station randomly selects a collision detection (CD) signature and transmits a CD preamble containing that signature. This CD preamble procedure is used to prevent interference when more than one MS has received an AP-AICH from the BS. When the base station receives CD preambles, it selects and identifies one preamble. The base station, then transmits a CD acknowledgement channel (CD-AICH) signal corresponding to the CD preamble selected from the received signals. Assuming successful resolution of any overlaps, and selection of the one CD preamble, the base station has effectively assigned the CPCH channel to the one mobile station. Upon receiving a CD acknowledgement CD-AICH, which correspond to the sent CD signature, the mobile station begins to send its packet data along with any closed-loop power control information. The base station also sends its downlink closed-loop power control information simultaneously. A pre-data power control phase is optional.

If the MS detects a loss of the downlink channel, for example, during transmission of the power control preamble or the packet data, the MS halts CPCH uplink transmission. Essentially, the mobile station aborts the access attempt and sends a failure message to the MAC layer of the associated data equipment. The base station can utilize this feature, by cutting off the downlink transmission, to instruct mobile stations not to use a channel following an unresolved collision.

During a transmission of data, the mobile station that has successfully obtained access can piggy-back packets, one after another, so long as it has packets ready to send, up to a maximum limit set by the network. Essentially, this allows the mobile station to hold the CPCH channel if the MAC equipment supplies further packets to the PHY elements in the midst of an uplink transmission.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
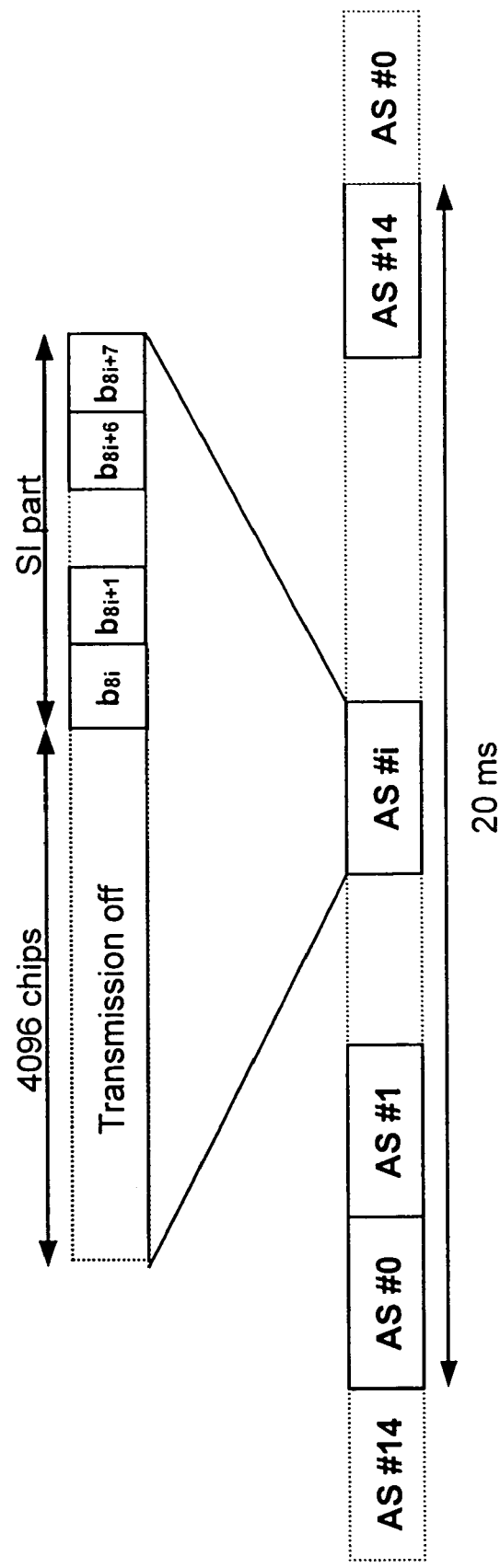
FIG. 1 is an illustration of the frame structure of a CPCH status indicator channel (CSICH) used to provide information as to the availability of a plurality of CPCH channels in accord with the present invention.

Reference now is made in detail to the presently preferred embodiments of the invention, examples of which are illustrated in the accompanying drawings, wherein like reference numerals indicate like elements throughout the several views.

The present invention involves a hybrid DSMA-CR/CDMA methodology for selecting and accessing one of a number of communication channels in a spread spectrum wireless communication network. The inventive access methodology accommodates bursty traffic in an optimum manner. The hybrid DSMA-CR/CDMA method provides a proactive approach to avoid collision by having the base station broadcast the availability and available data rates for each channel or group of its channels.

Figure 2:
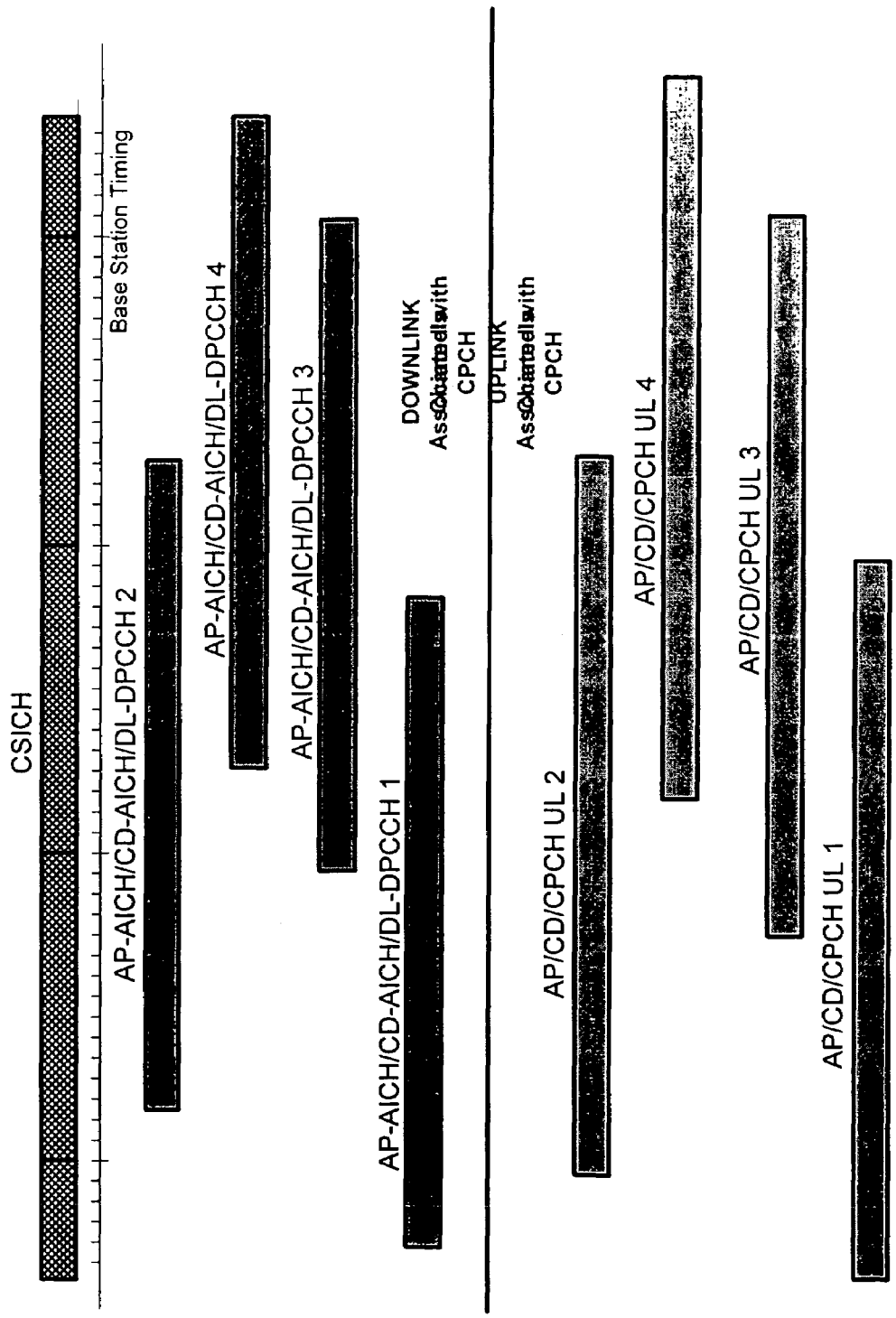
FIG. 2 is an illustration of the relationship of a number of CPCH channels to the CSICH channel.

The broadcast of the CPCH channel-availability information preferably uses a common channel, referred to herein as a CPCH status indicator channel (CSICH). FIG. 1 shows an example of the frame structure of a CSICH channel. The CSICH channel is a fixed rate (SF=256) physical channel used to carry CPCH status information. Although the inventive concepts encompass other forms of channelization, a CSICH is typically associated with a physical channel used for transmission of CPCH AP-AICH and uses the same channelization and scrambling codes. FIG. 2 provides a logical diagram of the CSICH, as well as the downlink (DL) and uplink (UL) CPCH channels used through one exemplary base station. Each uplink (UL) channel is associated with a downlink (DL) channel, to form a channel pair for associated two-way packet data communications between a mobile station and the base station. The drawing shows four such pairs of UL and DL channels, although the network may allocate fewer channels or more channels to any particular base station.

The mobile station uses the broadcast information in the CSICH to select an idle CPCH channel with sufficient data rate before initiating its upstream transmission. The mobile station attempts to seize the selected uplink (UL) channel and waits for an acknowledgement over the associated downlink (DL) channel. To appreciate the hybrid methodology, it may be helpful to first recap the basic functions of CPCH and DSMA.

The basic common-packet channel CPCH is an uplink transport channel for transmitting variable size packets from a remote or mobile station (MS) to a base station (BS), without the need for direct resource allocation. The channel resource allocation is contention based. A number of mobile stations could at any time contend for the same resources, as in ALOHA systems.

In operation, a MS upon power-up searches for a transmission from any nearby BS. Upon successful synchronization with one or more BSs, the MS receives the necessary system parameters from a continuously transmitted BS broadcast control channel (BCCH), which is broadcast by all base stations. Using the information transmitted from the BCCH, the MS can determine various parameters required when first transmitting to a BS. Parameters of interest are the loading of all the base stations in the vicinity of the MS, their antenna characteristics, spreading codes used to spread the downlink transmitted information, timing information and other control information.

Figure 3:
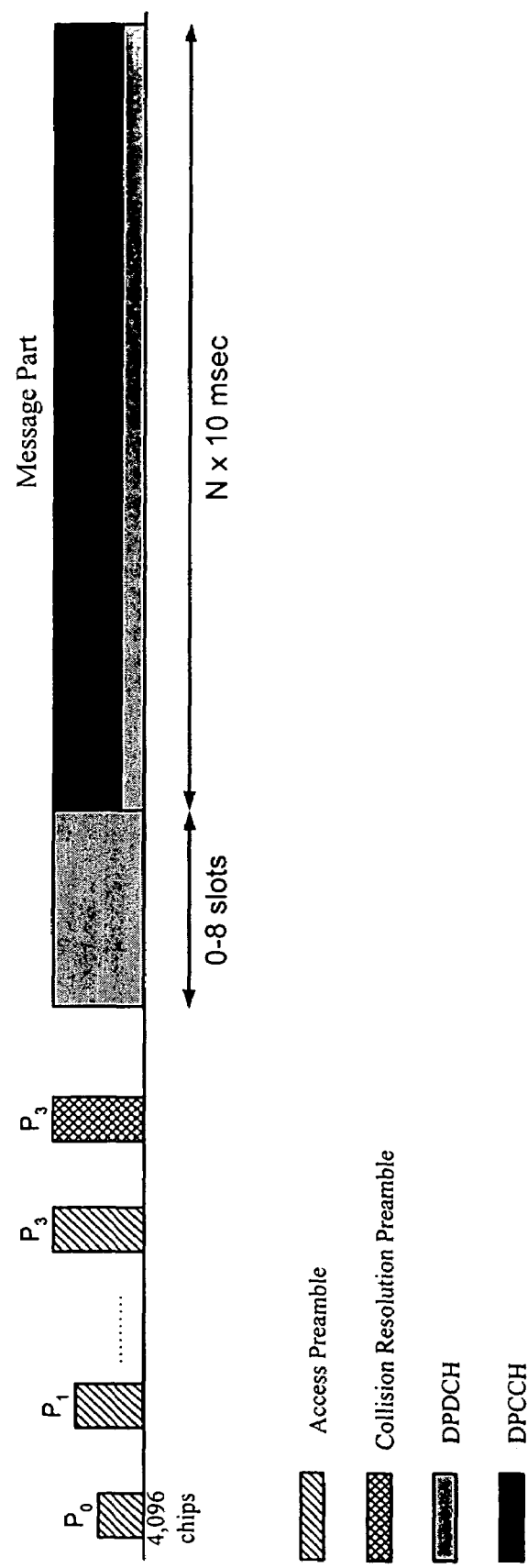
FIG. 3 is an illustration of the structure of the CPCH random access transmission.

With this information, the remote or mobile station (MS) can transmit specific waveforms in order to capture the attention of a nearby base station (BS). The MS, having all the necessary information from the nearby BS, starts transmitting a particular access preamble from a set of predefined access preambles. FIG. 3 shows the format of a random access CPCH transmission, and FIG. 4 illustrates examples of both the downlink (DL) and uplink (UL) transmissions.

The MS transmits the particular access preamble (AP) at predefined time intervals set according to synchronization information derived from downlink transmitted signals received over a broadcast channel. The MS transmits a set of access preambles of duration $T_p$ whose power is increased in time from preamble transmission to preamble transmission, preferably in a step-wise manner (see $P_0$ to $P_3$ in FIG. 3). The transmitted power during each access preamble transmission is constant. The transmission of the access preambles ceases when: (1) the access preamble has been picked up, detected, by the BS, and the BS has responded to the MS with an acknowledgment AP-AICH which MS has also successfully received; or (2) the MS has transmitted the maximum allowed number of access preambles $M_{AP}$.

With this ALOHA type access technique, there is a good possibility that two or more MSs may try to access the BS using the same access preamble at substantially the same time. In such a case, the AP-AICH acknowledgement signal could be successfully received by more than one MSs. If these MSs are allowed to transmit data, the transmissions will collide. In case of collision, none of the data from either of the transmitting MSs will be received correctly. To resolve this problem, the MSs need to undergo a collision detection or "CD" phase.

Figure 4:
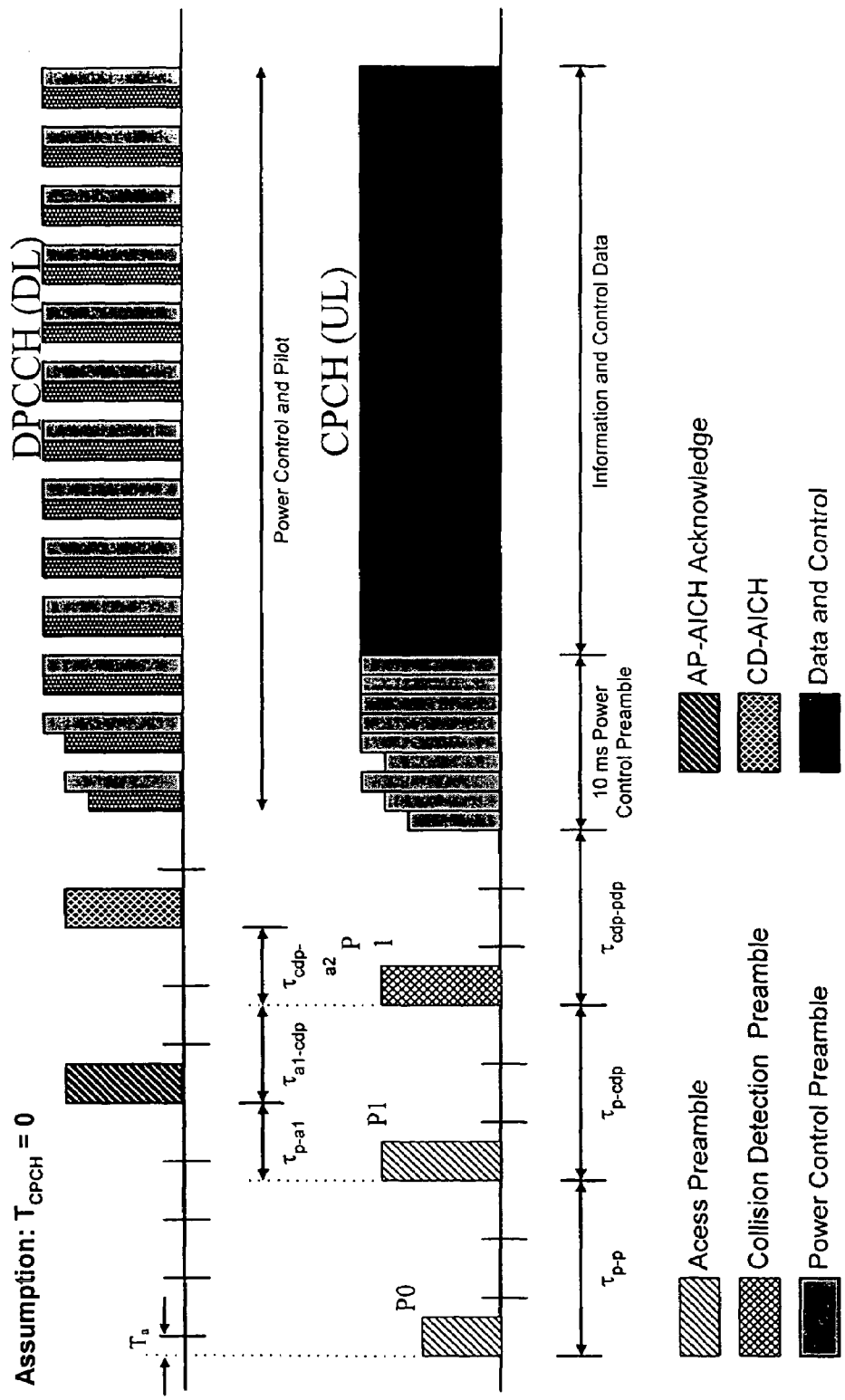
FIG. 4 is an illustration of the timing of PCPCH and AICH transmission as seen by the UE, with $T_{CPCH}=0$.

In the CD phase, upon receiving an AP-AICH acknowledgment, the MS randomly selects a collision detection (CD) signature from a predetermined set of possible CD signatures, and transmits a CD preamble containing the coded CD signature (shown as with cross-hatch shading at P1 on the UL channel in FIG. 4). If the base station successfully receives a CD preamble, it sends back a CD acknowledgement (CD-AICH), which is the same as or otherwise corresponds to the CD signature transmitted by the MS. The BS responds to only one of the many possible received CD preambles transmitted by different MSs. Upon receiving a CD-AICH corresponding to its own CD preamble signature, indicating that there we no collisions, the MS will begin to send its packet data along with any closed-loop power control information (FIG. 4). The BS will also send its downlink closed-loop power control information simultaneously (FIG. 4). Since the CD preamble signatures are chosen at random from the set of available signatures, it is very likely that different MSs will chose different CD preamble signatures. Any mobile station MS that does not receive a corresponding to its CD preamble CD-AICH signal, aborts its access attempt. This CD preamble procedure is used to prevent interference when two or more MSs have received a valid AP-AICH from the BS at the same time.

A Physical Common Packet Channel (PCPCH) is used to carry the logical CPCH. The CPCH transmission is based on DSMA-CD approach with fast acquisition indication. The MS can start transmission at a number of well-defined time-offsets, relative to the frame boundary of the received broadcast channel (BCH) of the current cell. The structure of the CPCH random access transmission is shown in FIG. 3. By means of an example, the CPCH random access transmission consists of one or several Access Preambles (AP) of length 4,096 chips, one Collision Detection Preamble (CD-P) of length 4,096 chips, 0 to 8 slots of a DPCCH Power Control Preamble (PC-P) and a message of variable length N times 10 msec.

The scrambling code of the Access Preamble and the CD preamble could be chosen to be a code segment of the Gold code. The message part carries the actual data and control information. The message is divided into 10 msec frames. $N_{MF}$ is a higher layer parameter. Each 10 msec frame is split into 15 slots, each of length $T_{slot}=2,560$ chips. Each slot consists of two parts, a data part that carries higher layer information and a control part that carries Layer 1 control information. The data and control parts are transmitted in parallel via I/Q multiplexing.

The data part consists of $10*2^k$ bits, where k=0, 1, 2, 3, 4, 5, 6, corresponding to spreading factors of 256, 128, 64, 32, 16, 8, 4 respectively. Various rates can be mapped to different signature sequences.

The spreading factor for the UL-DPCCH (message control part) is 256. CPCH can operate in all rates as shown above.

FIG. 4 illustrates the PCPCH/AICH timing relationship when $T_{CPCH}$ is set to 0 and all access slot subchannels are available for PCPCH. The TCPCH timing parameter determines the default access slot spacing between successive preambles and the response time of the base station to these preambles. When TCPCH is set to zero or one, the following PCPCH/AICH timing values apply:

Note that a1 corresponds to AP-AICH and a2 corresponds to CD-AICH.

$\tau_{p-p}$=Time to next available access slot, between Access Preambles. Minimum time=15,360 chips+5,120 chips× $T_{CPCH}$ Maximum time=5,120 chips×12=61,440 chips Actual time is time to next slot (which meets minimum time criterion) in allocated access slot subchannel group.

$\tau_{p-a1}$=Time between Access Preamble and AP-AICH has two alternative values: 7,680 chips or 12,800 chips, depending on $T_{CPCH}$ $\tau_{a1-cdp}$=Time between receipt of AP-AICH and transmission of the CD Preamble has one value: 7,680 chips.

$\tau_{p-cdp}$=Time between the last AP and CD Preamble is either 3 or 4 access slots, depending on $T_{CPCH}$ $\tau_{cdp-a2}$=Time between the CD Preamble and the CD-AICH has two alternative values: 7,680 chips or 12,800 chips, depending on $T_{CPCH}$ $\tau_{cdp-pcp}$=Time between CD Preamble and the start of the Power Control Preamble is either 3 or 4 access slots, depending on $T_{CPCH}$ The downlink control channel, DPCCH, contains fields comprising Pilot, FBI and TPC bits. Table 1 defines the DPCCH fields, which only include Pilot, FBI and TPC bits.

TABLE 1

DPCCH fields for CPCH power control preamble segment.

| Slot Format #i | Channel Bit Rate (kbps) | Channel Symbol Rate (ksps) | SF | Bits/ Frame | Bits/ Slot | $N_{pilot}$ | $N_{TFCI}$ | $N_{FBI}$ | $N_{TPC}$ |
|---|---|---|---|---|---|---|---|---|---|
| 0 | 15 | 15 | 256 | 150 | 10 | 8 | 0 | 0 | 2 |
| 1 | 15 | 15 | 256 | 150 | 10 | 7 | 0 | 1 | 2 |

In accordance with Digital Sense Multiple Access (DSMA) approach, whenever a BS detects the presence of a subscriber unit transmission on the reverse or UL channel it asserts a periodically occurring flag, called a "busy/idle" flag, on the associated forward or DL channel. This flag is asserted logically true whenever the channel is busy. Any subscriber unit that already is transmitting when the busy/idle flag is set true may continue to transmit. However, all other subscriber units desiring access to a channel must wait for some predetermined period or until the busy/idle flag is reset or cleared indicating that at least one channel is idle and available. Since the two-way propagation delay is much less than the minimum packet length, the DSMA type protocols perform much better as compared to traditional slotted ALOHA type protocols. The physical layer and the underlying spread spectrum system allow the quick detection of the collision. In case of collision, the capture effect might lead to collision resolution, which increases the throughput efficiency.

The Packet Radio System can be modeled as an M/M/1 Queue since the packet arrival process is Poisson and the packet length distribution is assumed to be exponential. In "*Analytical model of Busy Channel Multiple Access for Packet Radio in a local environment, Oreste Andrisano, et al, IEEE Transaction on Vehicular Technology, November 1990*", the authors have used this model for the analysis of a Busy Channel Multiple Access Protocol. The authors showed throughput of up to 0.6 with delay of only a few slots. Such results can function as a lower bound for performance of the current invention. In the current DSMA-CR/CDMA method, there is a collision detection and resolution capability and there is room for priority schemes. The false digital sensing probability in the current proposal can be reduced to a very low number by allocation of the necessary power to the Free and Busy signals in the access method.

Figure 5:
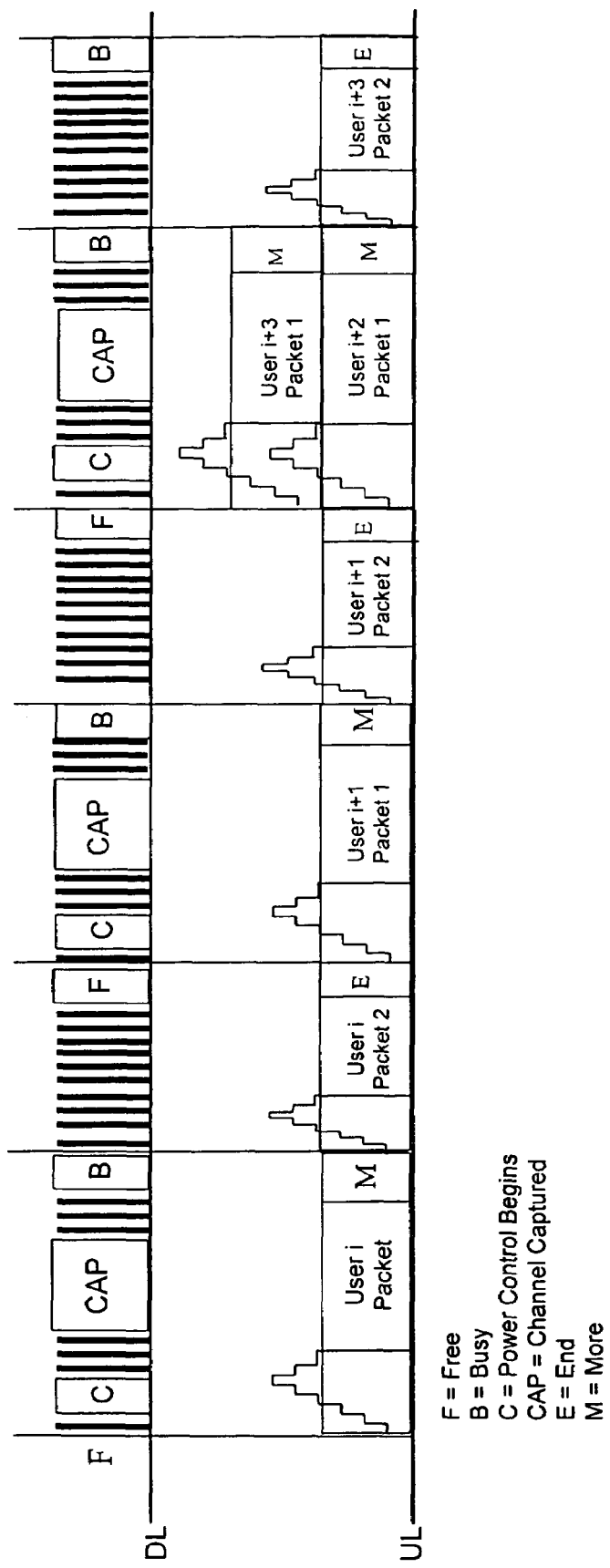
FIG. 5 is a signal diagram of a DSMA transmission.

FIG. 5 illustrates the operation of the DSMA-like protocol with CLPC. The Collision feedback delay cycle approaches zero and represents a small fraction of the packet length. The minimum packet length is 10 msec in this system. The top line represents the transmissions from the base station (BS) over the downlink (DL) channel. The bottom line represents the transmissions from the mobile station (MS) over the CPCH uplink (UL) channel. As can be seen in FIG. 5, the availability or non-availability of the CPCH channel is periodically broadcast in the associated downlink, where the F signal from the BS represents an indication that the channel is free, and the B signal from the BS represents an indication that the channel is busy.

The key issue in having a high throughput and low delay with this DSMA method is the periodic or non-periodic transmission of idle (F) and busy (B) indications of the CPCH channel. This periodicity could remain constant or it could vary. The broadcast information could be busy and free indications or only free indication. The different user devices MS seize the channel when idle, for transmission of one or more packets.

Hybrid DSMA/CDMA Method with Collision Resolution

Figure 6:
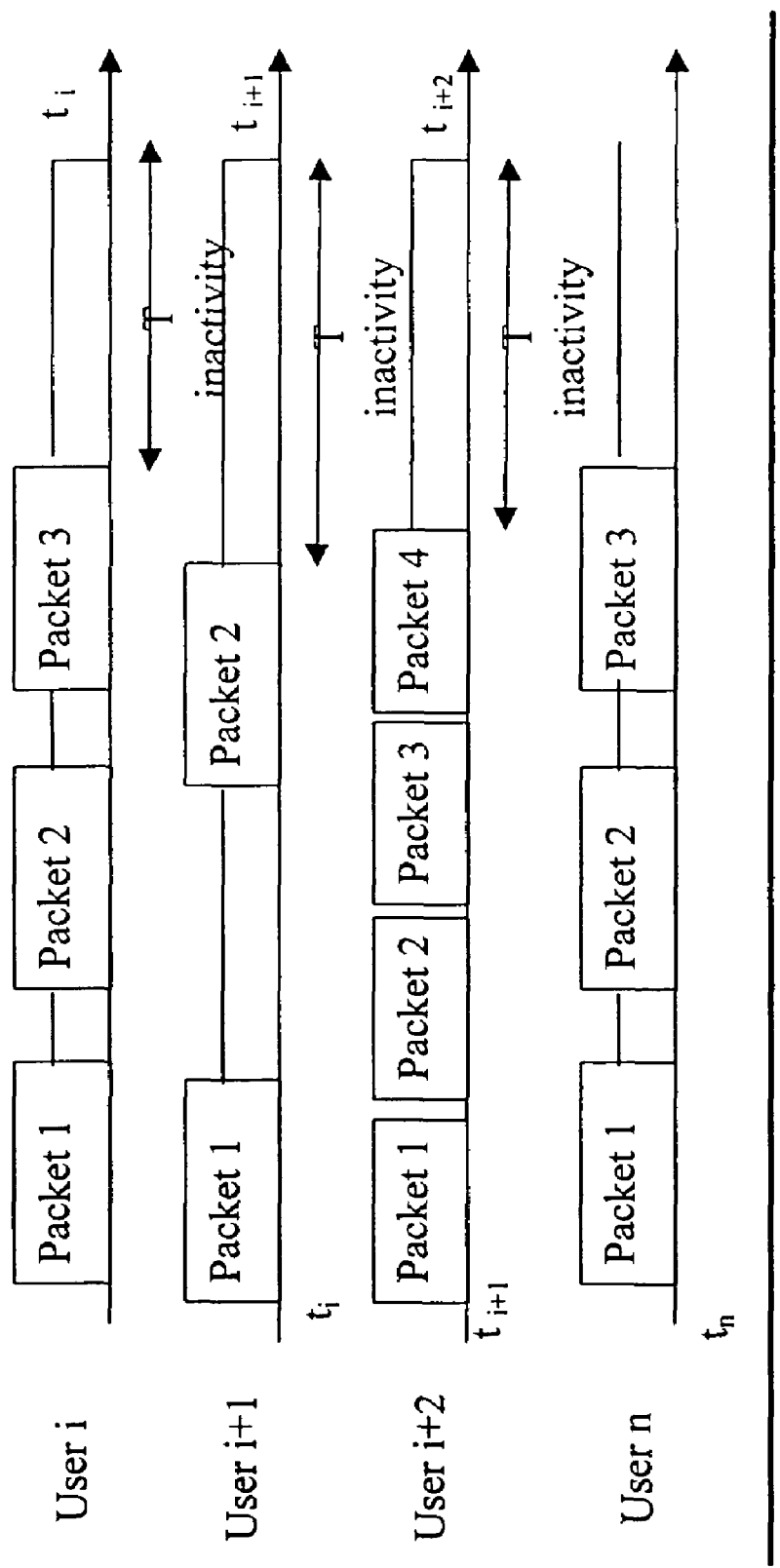
FIG. 6 is a diagram of the packet timing of a number of user CPCH transmissions.

The present invention is a hybrid DSMA/CDMA method and apparatus with collision resolution for spread spectrum communication. FIG. 6 represents the general environment of the packet generation and thus the demand for channel access in a multi-channel CDMA packet data network. The simplified illustration represents users i to n (four shown), wherein the associated data equipment generates packets for transmission at relatively random times. The MAC or media access control layer devices supply these packets to the PHY or physical layer elements for transmission over the CDMA network. As shown in the simplified example of FIG. 2, a base station (BS) provides a plurality of channel pairs. The PHY or physical layer elements must communicate with the base station to select and obtain access to an available uplink (UL) channel for transmission of the packets. Where there are sufficient channel resources for all active users, all user devices may transmit over the channels, essentially in parallel. However, during these transmissions there often are other User Equipment (UE) awaiting access to a channel.

In a preferred embodiment (FIG. 7), the CDMA system comprises a radio network controller (RNC) 11, a plurality of base stations 13 and a plurality of mobile stations 15. Each base station (BS) 13 has BS-spread-spectrum transmitter and a BS-spread-spectrum receiver, shown as a single transceiver (XSCV'R) system 17 for simplicity in this drawing. Each of the mobile stations (MS) 15 has an MS-spread-spectrum transmitter and an MS-spread-spectrum receiver (not separately shown). Exemplary transmitters and receivers for use in the BS and MS network elements are discussed in more detail below with regard to FIGS. 8 and 9. In a typical embodiment, the radio network controller (RNC) 11 provides two-way packet data communications to a wide area network, shown by way of example as a packet-switched network 19. The RNC 11 and the network 19 provide the MS units 15 with two-way packet data communications services to enable communication to and from devices, represented by way of example by the IP telephone 21, the personal computer (PC) 23 and the server 25.

The CDMA system provides a number of logically different channels for upstream and downstream communications over the air-link interface (see e.g. FIG. 2). Each channel is defined by one or more of the codes, for example the spreading code and/or the scrambling code. Several of the channels are common channels, but most of the channels are used for uplink or downlink packet communications between the base stations 13 and the mobile stations 15.

The RNC 11 measures traffic through the base stations 13 going to and from the mobile stations 15. In this way, the radio network controller (RNC) 11 monitors traffic demand in the illustrated network. The RNC 11 assigns channel resources to the base stations 13, by re-configuring the channel resources (channelization codes) within each cell of each base station 13. Each base station 13 maintains current status information, e.g. availability and/or available data rate, for each assigned channel and broadcasts that information in one of the common channels used by the base station.

According to the present invention, the spread-spectrum transmitter in the base station transceiver 17 broadcasts the status information to the mobile stations 15 on a periodic or non-periodic basis. This transmission utilizes one of the common downlink channels, which is referred to here as a CPCH status indicator channel (CSICH). This broadcast status information can relate the availability (Idle) or non-availability (Busy) of every single Common Packet Channel or the availability or non-availability of groups of Common Packet Channels. The broadcast status information may also indicate the available data rates for every single Common Packet Channel or for groups of Common Packet Channels.

The CPCH Status Indicator Channel (CSICH) is a fixed rate (SF=256) physical channel used to carry CPCH status information. In the preferred embodiment of FIG. 1, the CSICH is associated with a physical channel used for transmission of CPCH AP-AICH and uses the same channelization and scrambling codes. The illustrated CSICH frame consists of 15 consecutive access slots (AS) each of length 40 bits. Each access slot consists of two parts, a part of duration 4096 chips with no transmission that is not formally part of the CSICH, and a Status Indicator (SI) part consisting of 8 bits $b_{8i}, \ldots b_{8i+7}$, where i is the access slot number. The part of the access slot with no transmission is reserved for use by AICH, AP-AICH or CD/CA-ICH. The modulation used by the CSICH is the same as for the PICH. The phase reference for the CSICH is the Primary CPICH.

The Status Indicators are in all the access slots of the CSICH frame, even if some signatures and/or access slots are shared between CPCH and random access channel (RACH) services. Each CSICH frame carriers N Status Indicators. The mapping from $\{SI_0, \ldots, SI_{N-1}\}$ to the CSICH bits $\{b_0, \ldots, b_{119}\}$ follows the rules set forth in table 1.

TABLE 1

Mapping of Status Indicators (SI) to CSICH bits

| Number of SI per frame (N) | $SI_n = 1$ | $SI_n = 0$ |
|---|---|---|
| N = 1 | $\{b_0, \ldots, b_{119}\} = \{-1, -1, \ldots, -1\}$ | $\{b_0, \ldots, b_{119}\} = \{+1, +1, \ldots, +1\}$ |
| N = 3 | $\{b_{40n}, \ldots, b_{40n+39}\} = \{-1, -1, \ldots, -1\}$ | $\{b_{40n}, \ldots, b_{40n+39}\} = \{+1, +1, \ldots, +1\}$ |
| N = 5 | $\{b_{24n}, \ldots, b_{24n+23}\} = \{-1, -1, \ldots, -1\}$ | $\{b_{24n}, \ldots, b_{24n+23}\} = \{+1, +1, \ldots, +1\}$ |
| N = 15 | $\{b_{8n}, \ldots, b_{8n+7}\} = \{-1, -1, \ldots, -1\}$ | $\{b_{8n}, \ldots, b_{8n+7}\} = \{+1, +1, \ldots, +1\}$ |
| N = 30 | $\{b_{4n}, \ldots, b_{4n+3}\} = \{-1, -1, -1, -1\}$ | $\{b_{4n}, \ldots, b_{4n+3}\} = \{+1, +1, +1, +1\}$ |
| N = 60 | $\{b_{2n}, b_{2n+1}\} = \{-1, -1\}$ | $\{b_{2n}, b_{2n+1}\} = \{+1, +1\}$ |

A variety of different availability-status bit mapping arrangements may be used. Higher layers set the values of the Status Indicators. At the user equipment (UE) the number of status indicators per frame is a higher layer parameter. The higher layers provide Layer 1 or PHY equipment with the mapping between the values of the Status Indicators and the actual availability of the CPCH resources.

Figure 7:
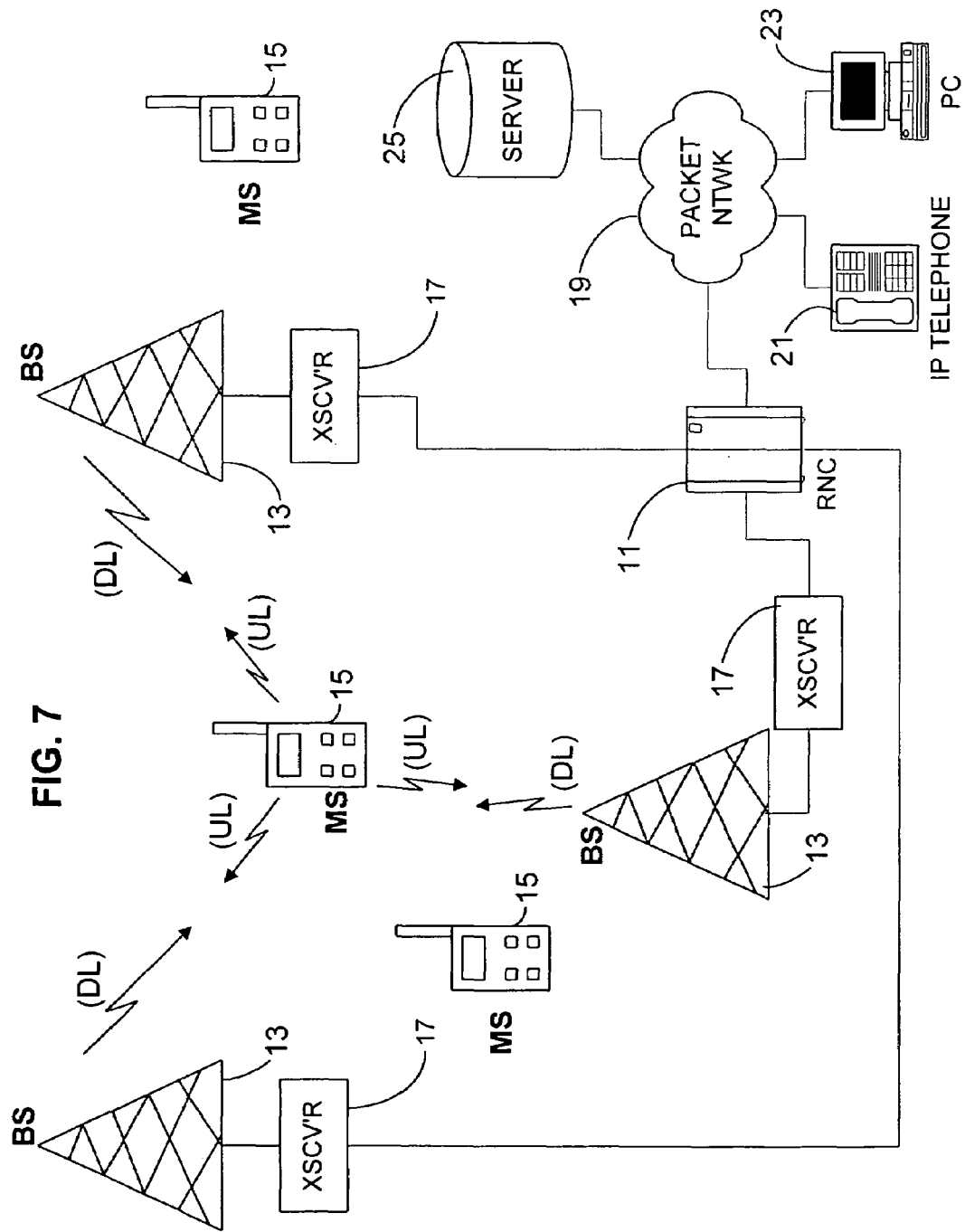
FIG. 7 is a functional block diagram of a CDMA network, capable of implementing the communications in accord with the present invention.

In operation of the network of FIG. 7, a mobile station (MS) 15 monitors the broadcast information on the CSICH channel. When the particular MS 15 has a first packet to transmit, it uses the latest broadcast information to select an idle CPCH uplink (UL) channel. The selection of UL channel by the MS can be based on a dynamic persistence algorithm or any other algorithm commonly known in the art.

The MS 15 then enters the access phase. The base station (BS) 13 transmits a common synchronization channel. In the access phase, the mobile station (MS) 15 initiates a ramp up process in order to capture the available CPCH channel. The access phase involves the MS-spread-spectrum transmitter sending one of more access preambles, in access slots defined in relation to a frame-timing signal derived from receipt of the common synchronization channel. Each preamble contains a signature selected from a set of predefined signatures at a well-selected time interval in sequentially increasing power levels. The selected signature effectively identifies the selected one of the uplink channels.

The transmission of the access preambles ceases when one access preamble has been picked up and detected by the BS, and the BS has responded with an acknowledgment AP-AICH, which the MS has also successfully received. In the alternative, the mobile station (MS) 15 will cease its transmission of access preambles if the MS has transmitted the maximum allowed number of access preambles $M_{AP}$.

If multiple MSs are trying to access the BS using the same access preamble signature, more than one mobile station might have succeeded through the first ramp-up phase at about the same time. Each successful mobile station 15 and the base station 13 will then enter a Collision Resolution phase, where the BS effectively assigns the requested CPCH channel to only one of the contending mobile stations. The collision resolution phase is also referred to as the channel assignment phase. In this collision resolution phase, upon receiving this AP-AICH, each successful MS randomly selects a collision detection (CD) signature and transmits a CD preamble. The BS only responds to one of the mobile stations by sending out a CD acknowledgement (CD-AICH), which corresponds to the CD signature of the selected MS. Typically the base station 13 transmits the CD preamble from the selected mobile station back over the corresponding downlink channel. However, another code could be used as the base station CD preamble signature in the CD-AICH signal, so long as it is known to correspond to the mobile station CD preamble.

Upon receiving this corresponding CD-AICH, the selected MS enters the data transmission phase and begins to send its packet data along with any closed-loop power control information. The BS also sends its downlink closed-loop power control information simultaneously. During the data transmission phase, if the PHY elements of the MS receive more packets in the interim, they will transmit the additional packet while the MS remains in control of its CPCH channel.

An optional pre-data power phase can be carried out before the data transmission phase after the MS receives the CD-AICH.

Any mobile station 15 that transmitted a CD preamble but failed to receive a corresponding acknowledgement CD-AICH with refrain from further transmissions on the CPCH channel. In this example, the collision has been resolved in the CD phase, and the base station 13 has allocated the CPCH channel to only one mobile station 15.

In case of an unresolved collision, two or more mobile stations will enter the pre-data power control phase or the message phase. Upon detection of such a condition, the BS will force the colliding mobile stations to abort their data transmissions by ceasing the transmission of the corresponding Downlink Dedicated channel DL-DPCCH. Upon detecting the loss of the DL-DPCCH transmission, each MS will abort its uplink transmission.

Another facet of this invention is introduction of channel resource assignment. The CPCH resources are assigned to the Base Node by the Radio Network Controller (RNC) based on the traffic demand projection. The RNC re-configures the CPCH set within a cell based on traffic measurement information that it receives from the Base Node and mobile stations. The channel resource assignment is optional.

There could be multiple CPCH channels and they could operate at various data rates. The flexibility to operate the CPCH at various rates allows the operator to match the incoming packet size distribution to the possible payload size in each CPCH data rate.

For each CPCH physical channel in a CPCH set allocated to a cell the following physical layer parameters are included in the System Information message:

Uplink (UL) Access Preamble (AP) scrambling code(s).
UL Access Preamble signature set
The Access preamble slot sub-channels group
AP-AICH preamble channelization code(s).
UL Collision Detection (CD) preamble scrambling code(s).
CD Preamble signature set
CD preamble slot sub-channels group
CD-AICH preamble channelization code(s).
CPCH UL scrambling code(s).
CPCH UL channelization code (variable, data rate dependant).
DPCCH Downlink (DL) channelization code(s) (512 chip)

The following are access, collision detection/resolution and CPCH data transmission parameters:

Power ramp-up, Access and Timing parameters (Physical layer parameters)

1) $M_{AP}$=Maximum number of allowed consecutive access attempts (retransmitted preambles) if there is no AP-AICH response.

2) $P_{CPCH}$=Initial open loop power level for the first CPCH access preamble sent by the MS.

3) $\Delta P_0$=Power step size for each successive CPCH access preamble.

4) $\Delta P_1$=Power step size for each successive CPCH access preamble in case of negative AICH. A timer is set upon receipt of a negative AICH. This timer is used to determine the period after receipt of a negative AICH when $\Delta P_1$ is used in place of $\Delta P_0$.

5) $T_{CPCH}$=CPCH transmission timing parameter

To ensure a complete understanding of the invention, it may be helpful to consider the structure of preferred embodiments of the base station transceivers and the mobile station transceivers.

Figure 8:
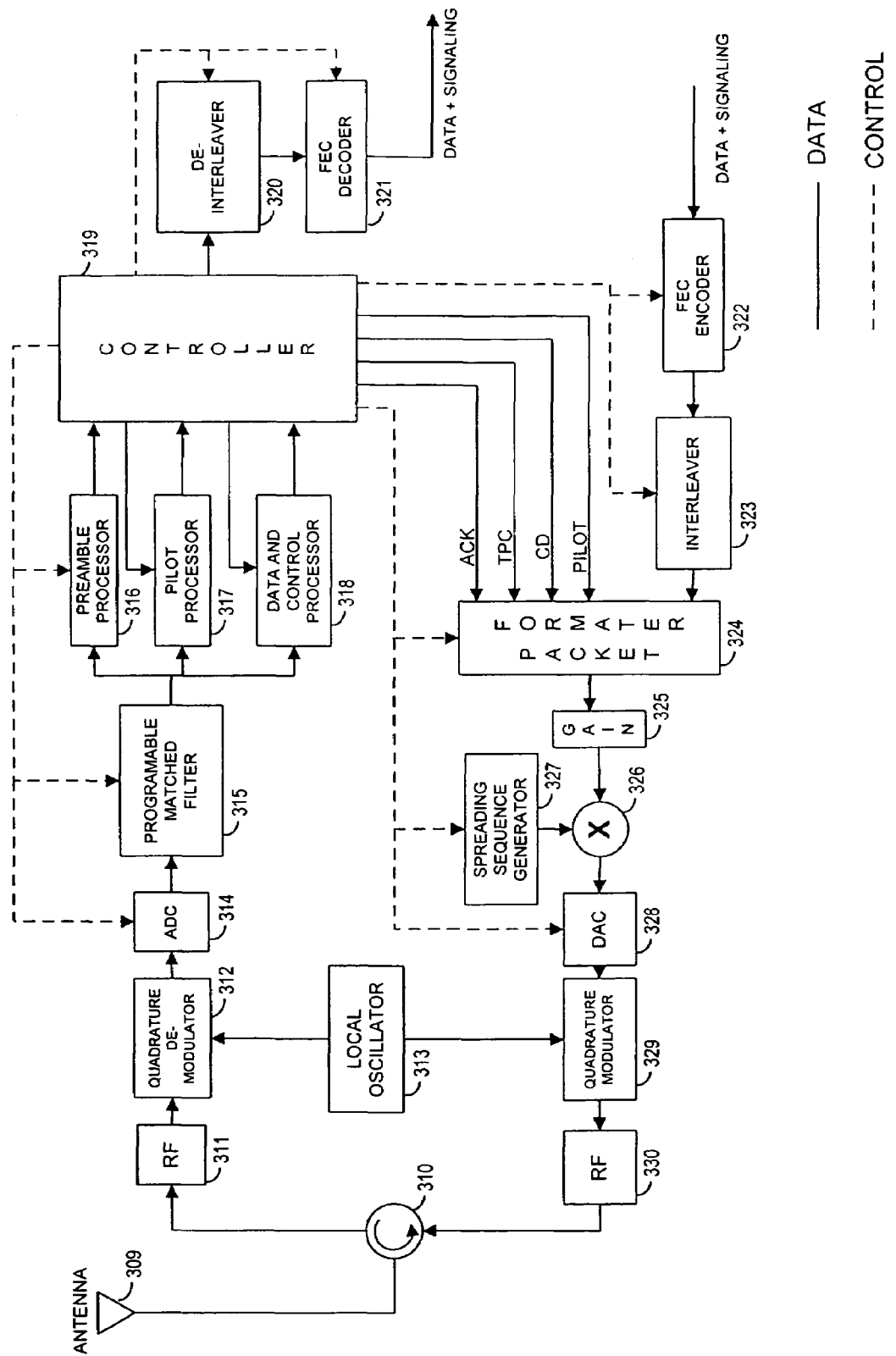
FIG. 8 is a functional block diagram of a spread spectrum base station for use in a network of the type shown in FIG. 7.

FIG. 8 illustrates a presently preferred embodiment of a BS spread-spectrum transmitter and a BS spread-spectrum receiver, essentially in the form of a base-band processor for performing the PHY layer functions. The BS spread-spectrum transmitter and the BS spread-spectrum receiver form one of the transceivers 17 at a base station 13. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321. The decoder 321 outputs data and signaling received via the UL channel to the MAC layer elements (not shown).

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, the programmable-matched filter 315, the preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by the receiver RF section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. These functions are well known in the art, and variations to this block diagram can accomplish the same functions.

The programmable-matched filter 315 despreads the received spread-spectrum signal components. A correlator, as an alternative, may be used as an equivalent means for despeading the received spread-spectrum signal.

The preamble processor 316 detects the preamble portion of the received spread-spectrum signal. The pilot processor 317 detects and synchronizes to the pilot portion of the received spread-spectrum signal. The data and control processor 318 detects and processes the data portion of the received spread-spectrum signal. Detected data passes through the controller 319 to the de-interleaver 320 and FEC decoder 321. Data and signaling from the UL are outputted from the FEC decoder 321 to the higher layer elements in or associated with the BS 13.

In the BS transceiver, the MAC layer elements supply data and signaling information, intended for DL transmission, to the input of the FEC encoder 322. The signaling and data are FEC encoded by FEC encoder 322, and interleaved by interleaver 323. The packet formatter 324 formats data, signaling, acknowledgment signal, collision detection signal, pilot signal and transmitting power control (TPC) signal into appropriate packets. Each packet is outputted from the packet formatter 324, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The modulated DL packet is translated to a carrier frequency, filtered and amplified by the transmitter RF section 330, and then it passes through the circulator 310 and is radiated by antenna 309.

Figure 9:
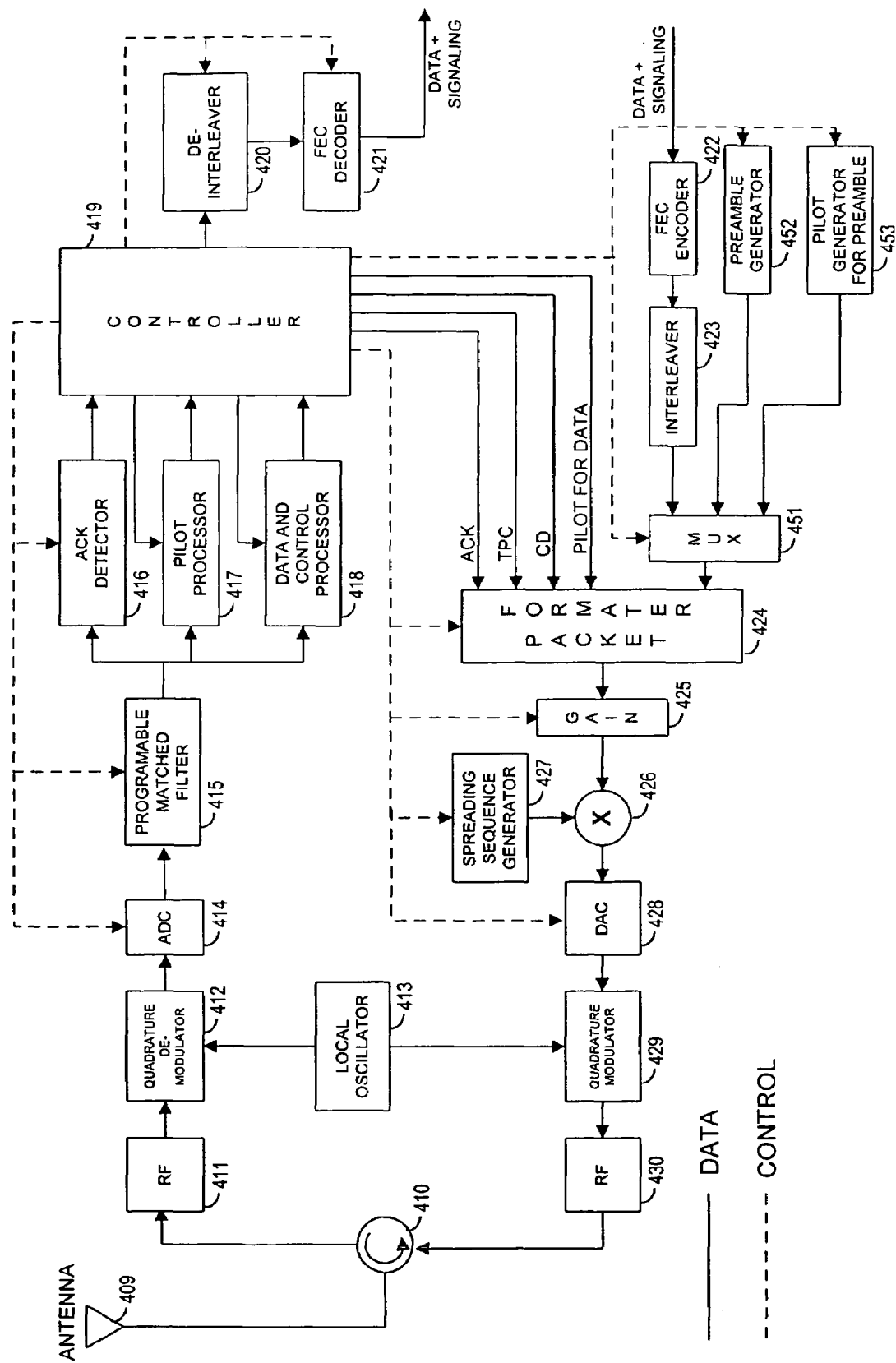
FIG. 9 is a functional block diagram of a spread spectrum remote or mobile station for use in a network of the type shown in FIG. 7.

FIG. 9 shows an embodiment of an MS spread-spectrum transmitter and an MS spread-spectrum receiver, essentially in the form of a base-band processor for performing the PHY layer transceiver functions. The MS spread-spectrum transmitter and the MS spread-spectrum receiver are located at the remote or mobile station (MS) 15, shown in FIG. 7. The MS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421. The decoder 421 outputs data and signaling received via the DL channel to the MAC layer elements (not shown) of the MS.

The MS spread-spectrum transmitter includes a forward-error-correction (FEC) encoder 422 coupled to an interleaver 423. A packet formatter 424 is coupled through a multiplexer 451 to the interleaver 423. The packet formatter 424 also is coupled to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, the programmable-matched filter 415, the acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by the receiver RF section 411. The local oscillator 413 generates a local signal, which the quadrature demodulator 412 uses to demodulate in-phase and quadrature phase components of the received spread-spectrum signal. The analog-to-digital converter 414 converts the in-phase component and the quadrature-phase component to digital signals. These functions are well known in the art, and variations to this block diagram can accomplish the same functions.

The programmable-matched filter 415 despreads the received spread-spectrum signal components. A correlator, as an alternative, may be used as an equivalent means for despeading the received spread-spectrum signal.

The acknowledgment detector 416 detects the acknowledgment in the received spread-spectrum signal. The pilot processor 417 detects and synchronizes to the pilot portion of the received spread-spectrum signal. The data and control processor 418 detects and processes the data portion of the received spread-spectrum signal. Detected data passes through the controller 419 to the de-interleaver 420 and FEC decoder 421. Data and signaling from the DL are outputted from the FEC decoder 421 to the higher level elements in or associated with the MS 15.

In the MS transceiver, the MAC layer elements supply data and signaling information intended for transmission over the UL channel, to the input of the FEC encoder 422. Data and signaling information are FEC encoded by FEC encoder 422, and interleaved by interleaver 423. The preamble generator 452 generates a preamble, and the pilot generator 453 generates a pilot for the preamble. The multiplexer 451 multiplexes the data, preamble and pilot, and the packet formatter 424 formats the preamble, pilot and data into a common-packet channel packet. Further, the packet formatter 424 formats data, signaling, acknowledgment signal, collision detection signal, pilot signal and TPC signal into a packet. The packet formatter 424 outputs the packet, and the packet level is amplified or attenuated by variable gain device 425. The packet is spread-spectrum processed by product device 426, with s spreading chip-sequence from spreading-sequence generator 427. The packet is converted to an analog signal by digital-to-analog converter 428, and quadrature modulator 429 using a signal from local oscillator 413 generates in-phase and quadrature-phase components. The modulated UL packet is translated to a carrier frequency, filtered and amplified by the transmitter RF section 430 and then it passes through the circulator 430 and is radiated by the antenna 409.

Below is an illustration of a physical layer access procedure for the MS:

1) The MS monitors the Status Broadcast information to determine the availability of the CPCH channels.

2) The MS MAC function selects a CPCH transport channel from the channels available in the assigned CPCH set. The CPCH channel selection preferably uses a dynamic persistence algorithm for the selection of the CPCH channel.

3) The MS MAC function builds a transport block set for the next transmission or transport interval (TTI) using transport formats, which are assigned to the logical channel with data to transmit, and sends this transport block set to the MS PHY function for CPCH access and uplink transmission on the selected CPCH transport channel.

4) The MS sets its preamble transmit power to the value $P_{CPCH}$ which is supplied by the MAC layer for initial power level for this CPCH access attempt.

5) The MS sets the AP (access preamble) Retransmission Counter to $M_{AP}$, the maximum number of allowed consecutive access attempts (retransmitted preambles) if there is no AP-AICH response.

6) The MS randomly selects a CPCH-AP signature from the signature set for this selected CPCH channel.

7) The MS derives the available CPCH-AP access slots in the next two frames, defined by SFN and SFN+1 in the AP access slot sub-channel group, a sub-channel group is defined as a set of access slots and access preamble signatures. The MS randomly selects one access slot from the available access slots in the next frame, defined by SFN, if there is one available. If there is no access slot available in the next frame, defined by SFN then, the MS randomly selects one access slot from the available access slots in the following frame, defined by SFN+1.

8) The MS transmits the access preamble using the MAC supplied uplink access slot, signature, and initial preamble transmission power $P_{CPCH}$.

9) If the MS does not detect any acquisition indicator (A1), as an acknowledgement corresponding to the selected signature in the downlink access slot corresponding to the selected uplink access slot, the MS:

a) Selects the next uplink access slot from among the access slots in the CPCH-AP sub-channel group. There must be a minimum distance of three or four access slots from the uplink access slot in which the last preamble was transmitted depending on the CPCH/AICH transmission timing parameter.

b) Increases the preamble transmission power by the specified offset ΔP. Power offset $ΔP_0$ is used unless the negative AICH timer is running, in which case $ΔP_1$ is used instead.

c) Retransmits access preamble using new parameters.

d) Decreases the Preamble Retransmission Counter by one.

e) If the Preamble Retransmission Counter<0, the MS aborts the access attempt and sends a failure message to the MAC layer.

10) If the MS detects a AP-AICH_NEG (negative acquisition indicator) corresponding to the selected signature in the downlink access slot corresponding to the selected uplink access slot, the MS aborts the access attempt and sends a failure message to the MAC layer. The MS sets the negative AICH timer to indicate use of $ΔP_1$ as the preamble power offset until the timer expires.

11) Upon reception of AP-AICH (positive access preamble acquisition indicator for the channel), the access segment ends and the contention or collision resolution segment begins. In this segment, the MS randomly selects a CD signature from the signature set and also selects one-CD access slot sub-channel from the CD sub-channel group supported in the cell and transmits a CD Preamble, then waits for a CD-AICH (collision detection-acquisition indicator channel) transmission by the BS.

12) If the MS does not receive a corresponding CD-AICH in the designated slot, the MS preamble from the base station aborts the access attempt and sends a failure message to the MAC layer.

13) If the MS receives a CD-AICH in the designated slot with a signature that does not match the signature used in the CD Preamble, the MS aborts the access attempt and sends a failure message to the MAC layer. This result indicates that the base station allocated the channel to another MS during the contention resolution phase.

14) If the MS receives a CD-AICH with a matching signature, the BS has selected this MS and assigned the requested CPCH resource to this MS. The MS transmits the power control preamble $τ_{cd-p-pc-p}$ msec later as measured from initiation of the CD Preamble. The transmission of the message portion of the burst starts immediately after the power control preamble.

15) During CPCH Packet Data transmission, the MS and BS perform closed-loop power control on both the CPCH UL and the DPCCH DL.

16) If the MS detects a loss of DPCCH DL during transmission of the power control preamble or the packet data, the MS halts CPCH uplink transmission, aborts the access attempt and sends a failure message to the MAC layer elements.

17) If the MS completes the transmission of the packet data, the MS sends a success message to the MAC layer elements.

18) The MS will continue holding and using the CPCH channel if it receives more packets from the MAC in the midst of its uplink transmission.

Figure 10:
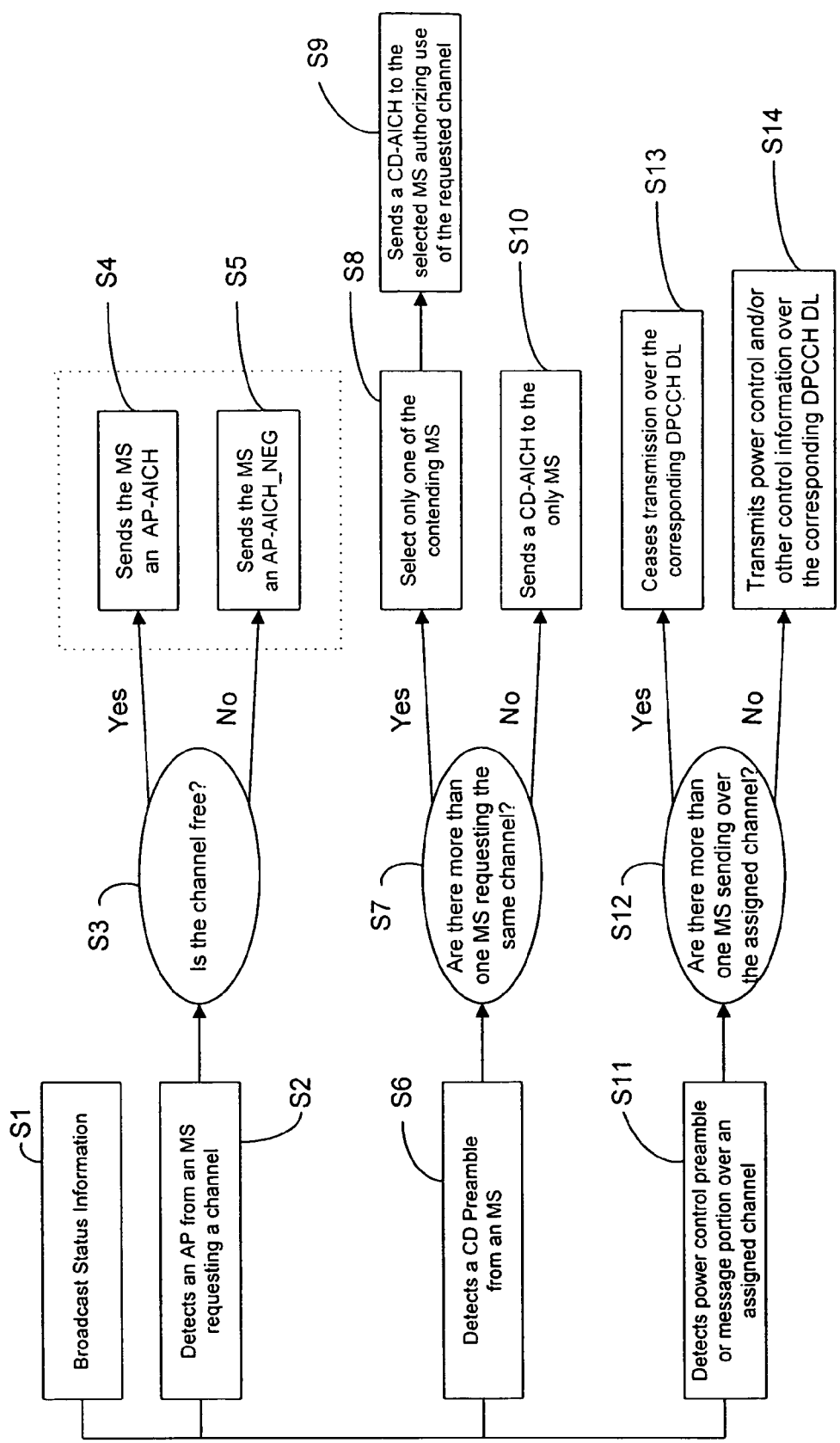
FIG. 10 a process flow diagram illustrating an example of the base station (BS) Access Procedure.

FIG. 10 is a flow-chart illustrating a physical layer procedure for a BS access procedure.

The Procedure Operates as Outlined Below.

First, the BS periodically or non-periodically broadcasts the availability of each CPCH channel or channel-group over a Status Broadcast Channel (S1). The availability information can be in the form of idle-ness or busy-ness or logical availability and may contain data rate availability information.

Upon detecting an access preamble (AP) from a mobile station (MS) requesting a CPCH channel (at S2), the base station (BS) sends out an acquisition indicator for the channel (AICH), which corresponds to the AP signature of the detected AP preamble. The BS sends the AP-AICH signal in a downlink access slot corresponding to the detected uplink access slot. At branch step S3, if the requested channel is available, the acquisition indicator is AP-AICH, indicating a positive response (S4). If the requested channel is not available, the acquisition indicator is AP-AICH_NEG, indicating a negative response (S5).

Upon detecting a CD Preamble from an MS (S6), the BS determines if there are two or more mobile stations requesting the available channel (S7). If multiple MS stations are requesting channel access, the BS selects one of those mobile stations (S8) and assigns the channel to the selected MS station by transmitting a CD-AICH (S9), which is a base station collision detection preamble that corresponds to the CD signature of the selected mobile station's CD Preamble. At the decision point S7, if there is only one MS requesting the available channel, the BS assigns the channel to the one MS by transmitting a CD-AICH which corresponds to the CD signature of that mobile station's CD Preamble (S10).

Upon receiving power control Preamble or packet data from a mobile station over an assigned channel (S11), the base station determines if there is one transmitting mobile station or multiple transmitting mobile stations (S12). If only one, then the base station transmits power control information on the DPCCH DL corresponding to the assigned channel (S13). However, if the determination at S12 indicates that there are multiple mobile stations transmitting over the assigned channel, then the BS ceases transmission on the corresponding DPCCH DL (S14) to instruct those mobile stations to abort transmissions over the assigned CPCH channel.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. In a wireless communication system employing spread-spectrum modulation comprising a plurality of base stations and a plurality of mobile stations, a method comprising:
   transmitting from a BS-spread-spectrum transmitter of one base station, a broadcast common-status channel, the broadcast common-status channel comprising data regarding current status as available for one or more channels from among a group of channels associated with the one base station;
   receiving the broadcast common-status channel at a MS-spread-spectrum receiver of one mobile station, and selecting one of the channels of the group based on the broadcast available status data;
   transmitting from a MS-spread-spectrum transmitter of the one mobile station an access-burst signal to request access to the selected channel, the access-burst signal comprising a plurality of segments having a plurality of respective power levels;
   receiving at a BS spread-spectrum receiver of the one base station at least one segment of the access-burst signal at a detectable-power level;
   responsive to receipt of the at least one segment at the detectable power level, transmitting an acknowledgment signal from the BS-spread-spectrum transmitter of the one base station;
   receiving the acknowledgment signal at the MS-spread-spectrum receiver of the one mobile station; and
   transmitting from the MS-spread-spectrum transmitter of the one mobile station a spread-spectrum signal comprising at least one of data and power control information, over the selected channel, responsive to the receipt of the acknowledgment signal.

2. The method of claim 1, wherein the selected channel is a common packet channel.

3. The method of claim 1, wherein:
   a transmission from the BS-spread-spectrum transmitter of the one base station intended for the one mobile station utilizes a downlink channel corresponding to the selected channel; and
   if the MS-spread-spectrum receiver of the one mobile station detects a loss of the downlink channel, the MS-spread-spectrum receiver of the one mobile station halts any further transmission over the selected channel.

4. The method of claim 1, further comprising a collision resolution phase executed between the receipt of the acknowledgment signal and the transmission by the one mobile station over the selected channel.

5. The method of claim 4, wherein the collision resolution phase comprises:
   transmitting from the MS-spread-spectrum transmitter of the one mobile station a spread-spectrum signal comprising a collision detection preamble;
   receiving the collision detection preamble from the one mobile station at the BS spread-spectrum receiver of the one base station and substantially concurrently receiving a collision detection preamble from another mobile station at the BS spread-spectrum receiver of the one base station;
   selecting the one mobile station for assignment of the selected channel;
   transmitting from the BS-spread-spectrum transmitter of the one base station a base station collision detection preamble, the base station collision detection preamble corresponding to the collision detection preamble from the one mobile station; and
   receiving the base station collision detection preamble at the MS-spread-spectrum receiver of the one mobile station,
   wherein the step of transmitting the spread-spectrum signal comprising one or more of data and power control information from the MS-spread-spectrum transmitter of the one mobile station over the selected channel is responsive to the receipt of the base station collision detection preamble.

6. The method of claim 1, wherein each segment of the access burst signal comprises a selected one of a group of access preamble signatures, the selected one signature corresponding to the selected channel.

7. The method of claim 6, wherein the acknowledgement signal corresponds to the selected one signature.

8. The method of claim 1, wherein the data regarding current status indicates an idle status for at least one channel from among a group of channels associated with the one base station.

9. The method of ciaim 1, wherein the step of transmitting over the selected channel comprises:
   transmitting a first packet that is ready to send over the selected channel; and
   piggybacking at least one additional packet that becomes ready-to-send immediately after transmission of the first data packet.

10. A method of allowing access to a channel of a wireless communication network, comprising:
    transmitting a broadcast common-status channel, the broadcast common-status channel comprising availability-related status information for one or more channels of a group of packet channels allocated to a base station of the network;
    receiving from a remote station an access burst, the access burst comprising a sequence of coded preamble signals at sequentially increasing discrete power levels, each coded preamble signal in the sequence comprising one of a plurality of possible signature codes, the one signature code corresponding to one of the packet channels selected from the group by the remote station based on the status information;
    detecting a first one of the coded preamble signals of the sequence that is received at an adequate power level; and
    upon detection of the first coded preamble signal at the adequate power level, transmitting an acknowledgement signal corresponding to the one signature code.

11. The method of claim 10, further comprising receiving any of data and power control information over the one packet channel from the remote station after the transmitting of the acknowledgement signal.

12. The method of claim 11, wherein the one packet channel is a common packet channel.

13. The method of claim 10, further comprising:
receiving from the remote station a first remote station collision detection preamble;
substantially concurrently receiving from another remote station a second remote station collision detection preamble; and
transmitting a base station collision detection preamble corresponding to the first remote station collision detection preamble.

14. The method of claim 13, further comprising performing a power control phase after transmitting the base station collision detection preamble and before receiving the any data over the one packet channel.

15. The method of claim 10, further comprising sending any of data and power control information for the remote station.

16. The method of claim 10, wherein the availability-related status information comprises at least one of:
data regarding availability of one or more channels from among the group of packet channels allocated to the base station, and
data regarding available data rates for one or more channels of the group of packet channels allocated to the base station.

17. A method of accessing a channel of a wireless communication network, comprising:
receiving a broadcast common-status channel from a base station of the network, the broadcast common-status channel comprising availability-related status information for one or more channels of a group of packet channels served through the base station;
selecting one packet channel from the group based on the status information;
transmitting an access burst, the access burst comprising a sequence of coded preamble signals at sequentially increasing discrete power levels, each coded preamble signal in the sequence comprising one of a plurality of possible signature codes, the one signature code corresponding to the selected packet channel;
receiving an acknowledgement signal from the base station over a downlink channel corresponding to the one packet channel following the transmission of one or more of the coded preamble signals, the acknowledgement signal corresponding to the signature code; and
transmitting any of data and power control information over the one packet channel following receipt of the acknowledgement signal.

18. The method of claim 17, further comprising receiving any of data and control information from the base station over a downlink channel corresponding to the one packet channel.

19. The method of claim 18, further comprising:
detecting a loss of the downlink channel; and
in response to detecting loss of the downlink channel, halting any further transmission over the one packet channel.

20. The method of claim 17, the one packet channel is a common packet channel.

21. The method of claim 17, further comprising:
transmitting a randomly generated remote station collision detection preamble upon receipt of the acknowledgement signal; and receiving a base station collision detection preamble corresponding to the remote station collision detection preamble,
wherein the step of transmitting over the one packet channel follows the receipt of the corresponding base station collision detection preamble.

22. The method of claim 17, wherein the received availability-related status information comprises at least one of:
data regarding availability of one or more channels from among the group of packet channels served through the base station; and
data regarding available data rates for one or more channels of the group of packet channels served through the base station.

23. The method of claim 17, wherein:
the selecting of the one packet channel occurs when the remote station has a first data packet to send, and
the transmitting over the one packet channel comprises:
transmitting the first data packet over the one packet channel following receipt of the acknowledgement signal; and
piggy-backing at least one additional packet that becomes ready-to-send immediately after transmission of the first data packet.

24. In a wireless communication system employing spread-spectrum modulation comprising a plurality of base stations and a plurality of mobile stations, a method comprising:
transmitting from a BS-spread-spectrum transmitter of one base station, a broadcast common-status channel, the broadcast common-status channel comprising data regarding available data rates for one or more channels of a group of channels associated with the one base station;
receiving the broadcast common-status channel at a MS-spread-spectrum receiver of one mobile station, and selecting one of the channels of the group based on the available data rates data;
transmitting from a MS-spread-spectrum transmitter of the one mobile station an access-burst signal to request access to the selected channel, the access-burst signal comprising a plurality of segments having a plurality of respective power levels;
receiving at a BS spread-spectrum receiver of the one base station at least one segment of the access-burst signal at a detectable-power level;
responsive to receipt of the at least one segment at the detectable power level, transmitting an acknowledgment signal from the BS-spread-spectrum transmitter of the one base station;
receiving the acknowledgment signal at the MS-spread-spectrum receiver of the one mobile station; and
transmitting from the MS-spread-spectrum transmitter of the one mobile station a spread-spectrum signal comprising at least one of data and power control information, over the selected channel, responsive to the receipt of the acknowledgment signal.

25. The method of claim 24, wherein the selected channel is a common packet channel.

26. The method of claim 24, further comprising transmitting any of data and power control information, to the MS-spread-spectrum receiver, from the BS-spread-spectrum transmitter of the one base station.

27. The method of claim 24, wherein the broadcast common-status channel further comprises data regarding the availability of one or more channels from among the group of channels associated with the one base station.

* * * * *